United States Patent [19]

Binnig et al.

[11] 4,422,002

[45] Dec. 20, 1983

[54] PIEZO-ELECTRIC TRAVELLING SUPPORT

[75] Inventors: Gerd Binnig, Richterswil; Hermann Nievergelt, Adliswil; Heinrich Rohrer, Richterswil; Edmund Weibel, Adliswil, all of Switzerland

[73] Assignee: International Business Machines Corporation, Armonk, N.Y.

[21] Appl. No.: 406,653

[22] Filed: Aug. 9, 1982

[30] Foreign Application Priority Data

Aug. 10, 1981 [EP] European Pat. Off. ........ 81106229.8

[51] Int. Cl.³ ............................................ H01L 41/08
[52] U.S. Cl. .................................... 310/328; 310/330
[58] Field of Search ................ 310/311, 328, 330, 331

[56] References Cited

U.S. PATENT DOCUMENTS 3,377,489  4/1968  Brisbane .............................. 310/328
3,952,215  4/1976  Sakitani .............................. 310/328
4,195,243  3/1980  Thaxter .......................... 310/328 X Primary Examiner—Mark O. Budd
Attorney, Agent, or Firm—Robert E. Sandt

[57] ABSTRACT

The travelling support (1) comprises a piezo-electric plate (2) resting on three legs (6) whose bottom surface is insulated from the bench (8) on which the support is to travel, by a dielectric (7). The piezo-electric plate (2) can be caused to contract by means of an actuating voltage applied via sliders (9, 10) to top and bottom electrodes on the plate (2). By applying a voltage to the legs (6), these may be clamped selectively by electrostatic forces effective across the dielectric (7). Appropriate control of the actuating and clamping voltages causes the support (1) to either move in a linear or rotary fashion. The displacements the support can perform per step are in the nanometer range.

7 Claims, 8 Drawing Figures

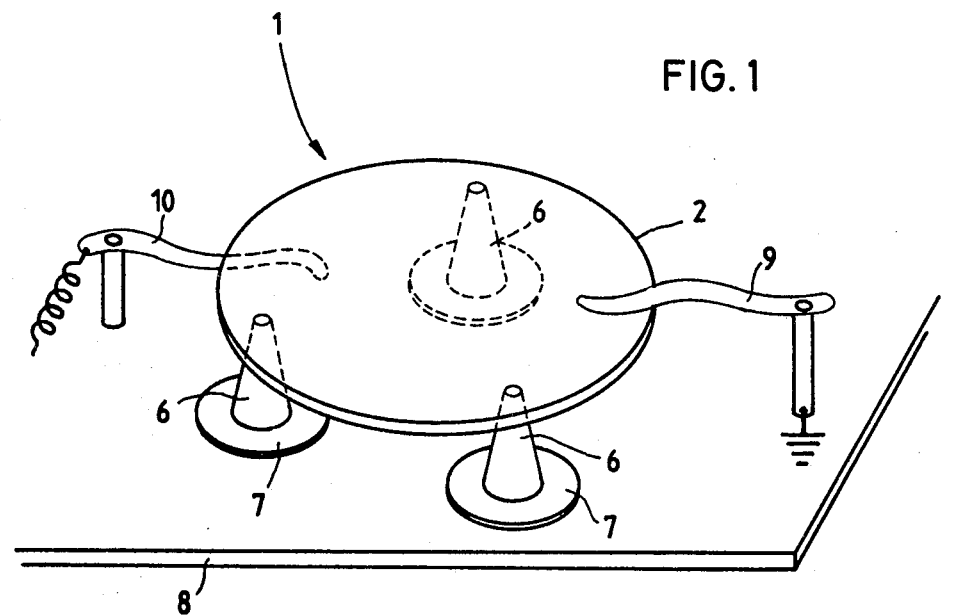
FIG. 1
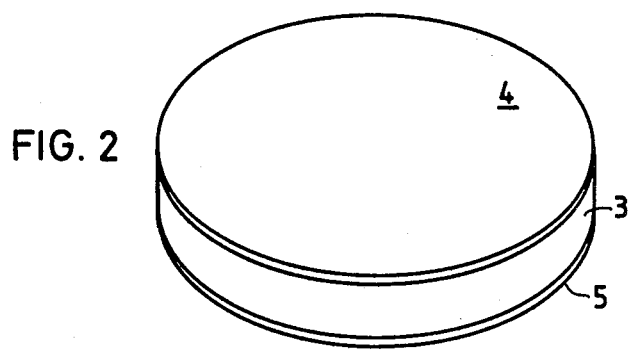
FIG. 2
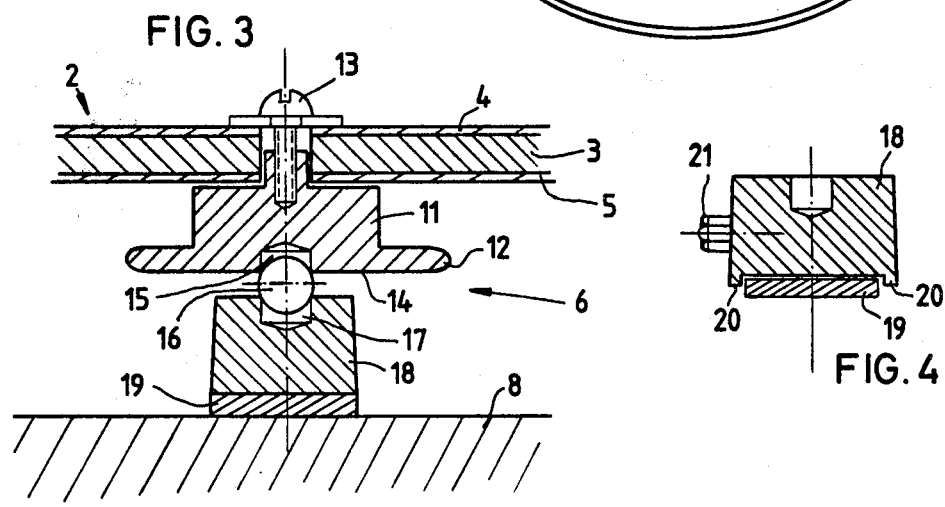
FIG. 3
FIG. 4

PIEZO-ELECTRIC TRAVELLING SUPPORT

TECHNICAL FIELD

The invention relates to an electric travelling support which permits displacements in the nanometer range as required e.g. in microscopy and device manufacture.

With the advent of the semiconductor technology the structures of electronic components have drastically decreased in size, and thus new manufacturing processes had to be developed to permit the fabrication of active and passive electronic components in the micrometer area. No doubt, the tendency is to still smaller structures.

The smaller the structures, the more important become the surface conditions of the materials from which they are built. This has given rise to an increased interest in the surface sciences coupled with a need to inspect surfaces before, during and after the performance of process steps. The surface features which one would like to make visible are in the nanometer range, i.e., well below the resolution of electron-beam microscopes. A known way to view features in this range is by scanning tunnelling microscopy where the flow of electrons tunnelling through a gap between a point electrode and the surface to be investigated is maintained at a constant level by keeping the gap constant and measuring the current of the servo required to control the gap.

In device manufacture the size of lines and components such as resistors, inductances and transistors in integrated circuits and especially in monolithic circuits has long entered the order of micrometers. The manufacturing methods for these devices e.g. include electron beam and laser beam treatment with the ensuing need for precise placement of substrates and chips as well as masks at tolerances in the nanometer range.

All of these techniques require reproducible linear displacements to be made in multiples of steps as small as 0.1 to 10 nm in two orthogonal directions with the additional complication that most of the processes and inspection steps must be performed under ultra-high vacuum (or in controlled-pressure gaseous atmospheres) and at temperatures ranging from several hundred degrees Centrigrade to almost 0 Kelvin.

Known in the art (IBM Technical Disclosure Bulletin Vol. 22, No. 7 P. 2897 Dec. 1979) is a piezo drive with course and fine adjustment in which a H-shaped piezo crystal can move inside a steel trough in a worm-like manner by alternately clamping the legs of the piezo crystal and contracting or elongating the central bar of the crystal. Two such devices would, of course, be required to permit movements in x-y directions.

Also known in the art (IBM Technical Disclosure Bulletin Vol. 23, No. 7B, P. 3369-3370, Dec. 1980) is a piezo travelling support consisting of an inner table resting on four piezo-electrically retractable legs and an outer piezo-electric frame connected to said table by piezo crystals and also having four retractable legs. Alternate placing or lifting of the legs of the table or frame, respectively, with simultaneous elongating/contracting the piezo crystals between table and frame causes the support to move.

Experiments with both supports have shown that their movements are not reproducible with the precision desired and that they require too sophisticated a control to be sufficiently easily manipulatable. Also, because of roughness of contamination of the surface on which the travelling support rests, one of its legs may lose contact with the surface and thus the support would tend to tip over, impeding correct movement.

The present invention has for its object to propose a travelling support which avoids the disadvantages of the prior art and still adds a new dimension of movement, namely that of rotation.

BRIEF DESCRIPTION OF DRAWINGS

Details of embodiments of the invention will now be described with reference to the drawings in which FIG. 1 is a perspective view of the general set-up of the travelling support.

FIG. 2 shows the structure of the piezo-electric plate.

FIG. 3 shows details of one of the legs on which the plate rests.

FIG. 4 shows one way of securing the dielectric under the leg of FIG. 3.

FIG. 1 shows the general set-up of the travelling support 1 with a piezo-electric plate 2 consisting of a piezo-crystal 3 of circular shape (FIG. 2), with an electrode 4 on the top surface and an electrode 5 covering the lower surface. Piezo-electric crystal assemblies of this type are commercially available. Plate 2 is suspended by three legs 6 whose upper end is rigidly connected to plate 2, e.g., by screws, and whose lower end rests on a dielectric layer 7 which may either be coated onto the lower surface of legs 6 or disposed freely between legs 6 and the bench 8 on which the support is to move. Of course, dielectric layer 7 may also be coated onto the surface of bench 8.

Figure 5:
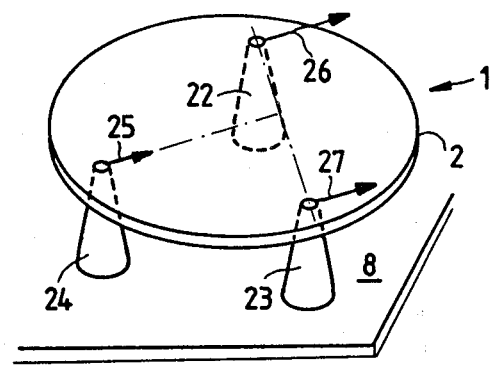
FIG. 5 serves to explain linear movement of the support.

Resting on the upper electrode 4 on the piezo-crystal 3 is a collecting slider 9 which in the preferred embodiment is electrically grounded. A similar slider 10 resting against the lower electrode 5 is connected to a voltage source and serves to supply the actuating voltage to piezo-crystal 3 as will hereinafter be explained.

Details of one of the legs 6 are shown in FIG. 3. To insulate the lower electrode 5 from the remainder of the travelling support, each of legs 6 comprises an insulating member 11 which may have an integrated insulating disk 12 as is known to prevent breakdown by surface conduction. Insulating member 11 is fixed to plate 2 by means of a screw 13 which may be made of ceramics. The lower surface 14 of the insulator has a hole 15 of a diameter slightly smaller than that of a steel ball 16 partly extending into hole 15.

Ball 16 also partly extends into a corresponding hole 17 machined into a metal foot 18. This arrangement permits a certain mutual tilting of the axes of insulator 11 and foot 18. This has proved very advantageous in view of the fact that the surface on which the support is travelling may be contaminated in some way or not entirely plane, thus possibly reducing the clamping power generated across the dielectric layer 19 as will be explained below.

Dielectric layer 19 is shown in FIG. 2 as being coated onto the lower surface of foot 18, thus insulating foot 18 from the surface of bench 8 on which support 1 is to travel. The same insulating effect can, of course, be obtained by covering the surface of bench 8 with dielectric layer 19 as mentioned before. Also, dielectric 19 may be kept under foot 18 by means of an annular rim 20 extending therefrom (FIG. 4).

The purpose of having a dielectric between feet 18 and bench 8 is to be able to selectively create a clamping action between them to control the movements of support 1. Since it is the intention to have the support perform steps of the order of nanometers, it is important that the surfaces sliding on each other as the support travels, are highly polished. In a preferred embodiment dielectric 19 consists of strontium titanate SrTiO$_3$ which is a heat-resistant compound with a high dielectric constant, and which is easily polishable. For less stringent requirements, the dielectric may simply consist of a polyester, polymere or polyamid film.

Clamping is achieved by well known electrostatic forces existing in an electric field between two parallel electrodes separated by a dielectric. In the preferred embodiment with a SrTiO$_3$ platelet of 0.1 mm thickness and having a dielectric constant $\epsilon_r$ of $5 \cdot 10^2$ and with a field strength of $2.2 \cdot 10^4 \text{Vcm}^{-1}$, the usual formula $$p = \tfrac{1}{2}\epsilon_0 \epsilon_r |\xi|^2$$

yields:

$$p \simeq 1 (\text{N/cm}^2)$$

The voltage is, therefore, to be applied between foot 18 and bench 8, the foot being equipped for the purpose with a terminal 21. For smooth operation, a d.c. voltage is recommended, but the clamping action can also be achieved with an a.c. voltage.

With reference to FIG. 5, the linear travelling support 1 will now be described. When a voltage is applied across piezo-crystal 3, a deformation of the crystal's shape occurs, whereby the diameter is contracted in favour of an increase in thickness. It is the contraction which is used for making support 1 travel, while the increase in thickness, being very small anyway, is not employed here.

Figure 6:
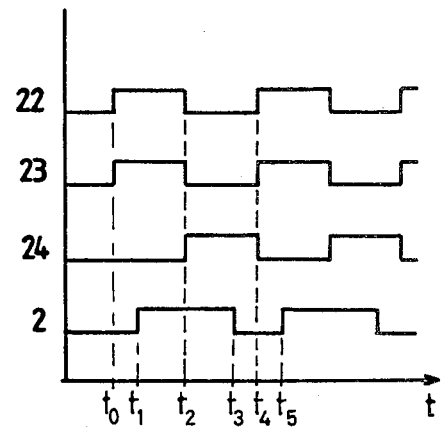
FIG. 6 shows a timing diagram for the movements in accordance with FIG. 5.

Assuming that at time $t_0$ (FIG. 6) feet 22 and 23 in FIG. 5 are electrostatically clamped to bench 8 and foot 24 is loose. When a voltage is applied at time $t_1$ to plate 2, the ensuing contraction of the piezo-crystal causes foot 24 to be moved in a direction orthogonal to a line connecting feet 22 and 23 as indicated by arrow 25. Clamping now foot 24 at time $t_2$ and simultaneously releasing feet 22 and 23 and only then (at time $t_3$) removing the voltage across plate 2 will cause feet 22 and 23 to move in the direction of arrows 26 and 27, respectively. Foot 24 may then be released at time $t_4$ and feet 22 and 23 again clamped so that as plate 2 is again subjected to a voltage at time $t_5$, the ensuing contraction again causes foot 24 to travel in the direction of arrow 25, and so forth.

It is to be noted that the construction occurring between feet 22 and 23 cannot result in any motion of support 1 with respect to bench 8 since these feet are clamped and the contraction is absorbed by the ball bearings between the feet and their respective insulating members.

Of course, support 1 may be moved in the same way in any of the other two directions under an angle of 60° from the direction of arrow 25 by appropriately clamping feet 22 and 24, or 23 and 24.

Figure 7:
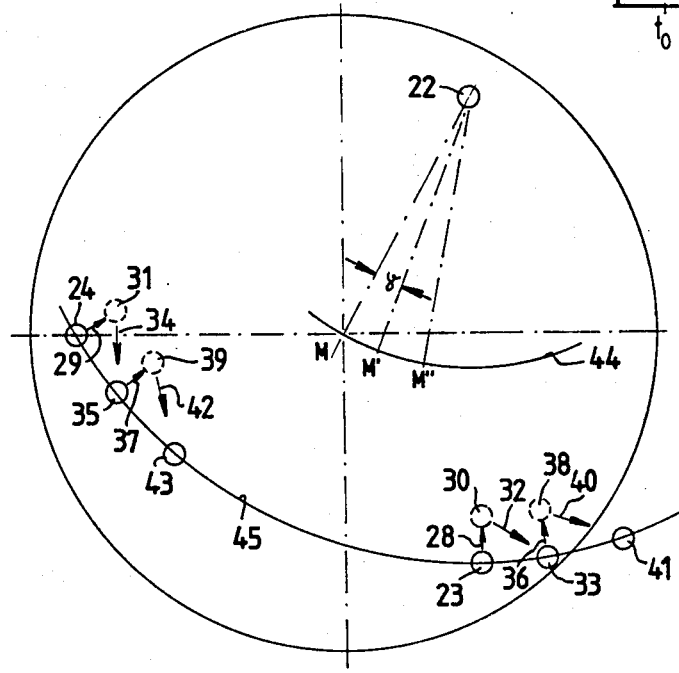
FIG. 7 serves to explain the rotary movement of the support.
Figure 8:
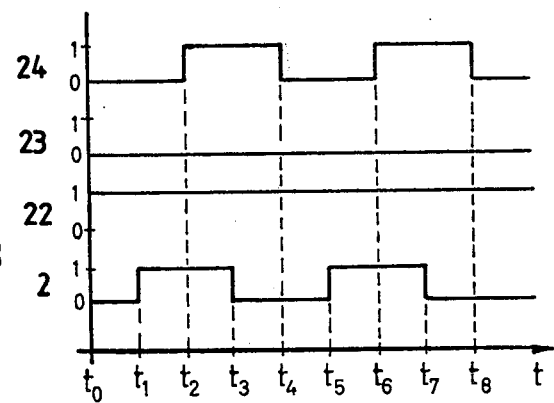
FIG. 8 is a timing diagram for the rotary movement in accordance with FIG. 7.

FIG. 7 shows in a top plan view (and in an exaggerated manner) the rotary movement support 1 can perform, and FIG. 8 is the appertaining timing diagram. Foot 22 remains clamped to bench 8 at all times, and at first ($t_0$), feet 23 and 24 are free to move. As a voltage is applied across the piezo-crystal in plate 2 ($t_1$) the plate contracts and moves feet 23 and 24 towards foot 22, as indicated by arrows 28 and 29, to positions 30 and 31, respectively. At time $t_2$ foot 24 is clamped to bench 8, only foot 23 being loose. When the actuation voltage is removed from plate 2 at time $t_3$, the latter re-expands. With feet 22 and 24 remaining clamped, plate 2 cannot assume its initial position, the expansion rather causing foot 23 to follow arrow 32 and assume position 33.

Since foot 24 has remained clamped so far, the expansion of plate 2 could not yield any effect on the position of this foot, and the displacement caused anyway on the point where the corresponding leg is fixed to plate 2 is absorbed by the ball-bearing in that leg. As foot 24 is now released at time $t_4$, the ball will tend to move foot 24 along arrow 34 to position 35. At the completion of this cycle, plate 2 will have rotated about foot 22 by a minute angle $\gamma$ measured between the initial line between foot 22 and the center M of plate 2 and the line between that foot and center M'.

The next cycle commencing at time $t_5$ with a new contraction of plate 2 with foot 22 always clamped and feet 23 and 24 loose, causes feet 23 and 24 from their respective positions 33 and 35 to move towards foot 22 along arrows 36 and 37 and to assume intermediate positions 38 and 39. At time $t_6$, foot 24 is clamped (at position 39), and at time $t_7$ is the actuating voltage removed from plate 2. The ensuing expansion brings foot 23 along arrow 40 to position 41 and after removal of the clamping voltage (at time $t_8$) foot 24 slides along arrow 42 to position 43.

As can be seen from FIG. 7, the center of plate 2 has moved along a circular arc 44 from M via M' to M", and accordingly have feet 23 and 24 removed from their initial positions along a common circle 45 to positions 41 and 43, respectively.

It will have become clear that the same rotative movement of plate 2 about any of the other two feet 23 and 24 is likewise possible by appropriate control of the clamping actions of the feet involved.

Where is it important that a device be rotated for investigation or inspection, it will obviously have to be placed over that foot which remains clamped throughout the rotation of plate 2.

Where x-y movements are intended, the device to be investigated will have to be placed at the edge of plate 2 opposite the foot which is always clamped, for in view of the very small steps with which we are concerned here, the displacements of said edge region may with good approximation be deemed linear and at right angles with respect to the direction away from said foot in the linear mode of operation.

In a case where longer x-y movements are required, one might consider stacking two supports 1 alligned such that precise x-y movements result.

The above description is based on the use of commercially available piezo-electric plates having top and bottom electrodes covering the entire surface of the piezo-crystal. Such plates typically have a diameter of 2 to 5 cm. By special design of the electrodes it will be possible to somewhat simplify the pattern of control pulses required for causing the intended movements, or else to adapt the path of travel of support 1 to the special needs of a particular application.

It should be mentioned that in case the legs supporting plate 2 are made rigid, i.e. without a "hinge" as shown in FIG. 3, those surfaces of feet 6, of dielectric 7 and of bench 8 between which a mutual displacement occurs as support 1 travels, would have to be kept absolutely in plane. In the proposed "hinged" construction, the contact surface of the foot can easily adapt to the dielectric or bench. Thus, only flat, polished contact surfaces are required.

From the foregoing it will have become apparent that the proposed support has a lot of important advantages over the state of the art of which the following deserve special mention: The materials used make this support capable of being operated in ultra-high vacuum (with preceding bake-out) and at cryogenic temperatures as well as at several hundred °C. when $SrTiO_3$ is used as the dielectric. The support is mechanically decoupled, except for the very thin electrical connections, from any external driving mechanism. It is, hence, suited for operation on vibration-protected benches. Neither the operation of the piezo-electric plate 2 nor the clamping of the feet will cause appreciable electric stray fields, nor are there any magnetic fields involved. This is important if the support is to be employed in connection with electron beam or ion beam treatments.

While the invention has been illustrated and described with reference to the preferred embodiment thereof, it is to be understood that the invention is not limited to the precise construction herein disclosed and the right is reserved to all changes and modifications coming within the scope of the invention as defined in the appended claims.

We claim:

1. Apparatus for producing precise minute controlled linear and rotary displacements of an assembly with respect to a base member, comprising
    a piezo-electric crystal assembly having electrodes on opposed parallel surfaces thereof;
    individual electrical connections to the said electrodes, which connections do not restrict movement of the crystal assembly;
    a plurality of electrically conductive support legs electrically insulated from said crystal assembly and yieldingly affixed thereto;
    an electrically conductive base member with respect to which said crystal assembly with affixed legs is operative to move;
    a dielectric member interposed between said legs and said base member;
    electrical connections to each of said legs and to said base member; and
    means for selectively applying timed electrical potentials respectively between said electrodes, and between each of said legs and said base member whereby the potential applied between a leg and the base member produces a clamping force to restrict the movement of that leg with respect to the base, and the potential applied between said electrodes produces a change in the dimension of the crystal resulting in movement of the nonclamped legs with respect to said base member.

2. The apparatus as defined in claim 1 wherein each leg consists of an insulating portion affixed to said crystal assembly, a metal portion cooperatively connected to said insulating portion and a dielectric layer secured to said metal portion.

3. The apparatus as defined in claim 2 wherein said insulating portion and said metal portion of each of said legs is operatively connected by means of a ball and socket joint.

4. The apparatus as defined in claim 2 wherein said dielectric member is retained within an annular recess integral with said metal portion of the leg, so that the leg is free to rotate with respect to said base member.

5. The apparatus as defined in claim 1 wherein the electrical connections to the said electrodes consist of resilient electrical contact members mounted for sliding engagement with said electrodes.

6. The apparatus as defined in claim 1 wherein the number of legs is three and the potentials applied between the said electrodes, and between each of said legs and said base member are sequenced in the following sequence with all elements initially depotentialized;
    (a) potentialize two of the three legs;
    (b) with the two legs remaining potentialized, potentialize the said electrodes;
    (c) with the said electrodes remaining potentialized, depotentialize the said two legs and potentialize the third leg; and
    (d) with the third leg remaining potentialized, depotentialize the said electrodes;
whereby the said crystal assembly is moved linearly in a direction perpendicular to a line connecting the said two legs.

7. The apparatus as defined in claim 1 wherein the number of legs is three and the potentials applied between the said electrodes, and between each of said legs and said base member are applied in the following sequence:
    with all of the elements initially depotentialized,
    (a) potentialize a first of said three legs;
    (b) with the said first leg remaining potentialized, potentialize the said electrodes;
    (c) with the said first leg and said electrodes remaining potentialized, potentialize a second pair of said legs; and
    (d) with the first of said legs remaining potentialized, depotentialize the said second leg;
whereby the said crystal assembly is rotated about the said first leg as an axis of rotation.

* * * * *

UNITED STATES PATENT AND TRADEMARK OFFICE
CERTIFICATE OF CORRECTION

PATENT NO. : 4,422,002

DATED : December 20, 1983

INVENTOR(S) : Gerd Binnig; Hermann Nievergelt; Heinrich Rohrer and Edmund Weibel It is certified that error appears in the above-identified patent and that said Letters Patent is hereby corrected as shown below:

Column 3, line 57, - the word "construction" should read -contraction-

Column 6, line 50,
    (Claim 7)   - the word "pair" should be deleted

Signed and Sealed this

Eighth Day of May 1984

[SEAL]

Attest:

GERALD J. MOSSINGHOFF

Attesting Officer    Commissioner of Patents and Trademarks